US010110591B2

(12) United States Patent
Meunier et al.

(10) Patent No.: US 10,110,591 B2
(45) Date of Patent: Oct. 23, 2018

(54) SYSTEM, METHOD, SERVER AND COMPUTER-READABLE MEDIUM FOR REAL-TIME VERIFICATION OF A STATUS OF A MEMBER OF AN ORGANIZATION

(75) Inventors: Sebastien Meunier, Drummondville (CA); Pierre Belisle, Quebec City (CA); Guy Dartigues, Montreal (CA)

(73) Assignee: CLAWD TECHNOLOGIES INC., Drummondville, Quebec (CA)

( * ) Notice: Subject to any disclaimer, the term of this patent is extended or adjusted under 35 U.S.C. 154(b) by 98 days.

(21) Appl. No.: 14/009,061

(22) PCT Filed: Mar. 30, 2012

(86) PCT No.: PCT/CA2012/000290
§ 371 (c)(1),
(2), (4) Date: Apr. 17, 2014

(87) PCT Pub. No.: WO2012/129664
PCT Pub. Date: Oct. 4, 2012

(65) Prior Publication Data
US 2014/0223172 A1 Aug. 7, 2014

Related U.S. Application Data

(60) Provisional application No. 61/470,537, filed on Apr. 1, 2011.

(51) Int. Cl.
*H04L 29/06* (2006.01)
*H04L 9/32* (2006.01)

(52) U.S. Cl.
CPC .......... *H04L 63/0823* (2013.01); *H04L 9/321* (2013.01); *H04L 9/3263* (2013.01)

(58) Field of Classification Search
CPC ... H04L 9/321; H04L 63/0823; H04L 9/3263; H04L 29/06
(Continued)

(56) References Cited

U.S. PATENT DOCUMENTS 6,948,063 B1 * 9/2005 Ganesan ............... G06F 21/445
705/53
9,009,477 B2 * 4/2015 Das ........................ H04L 9/321
713/168

(Continued)

FOREIGN PATENT DOCUMENTS

WO   2012129664   10/2012

OTHER PUBLICATIONS

International Search Report and Written Opinion for PCT/CA2012/000290 dated Jul. 11, 2012.

(Continued)

*Primary Examiner* — Farid Homayounmehr
*Assistant Examiner* — Sanchit K Sarker
(74) *Attorney, Agent, or Firm* — James P. Muraff; Neal, Gerber & Eisenberg LLP

(57) ABSTRACT

A method, system, server and computer-readable medium enable verification of a member of an organization and the generation of a session-specific certificate for the member upon receipt of a status report indicating that the member is in good standing with the organization. When the member logs in, the member's credentials are retrieved from an identification server that enables the identification of web services associated with the organization to which the member belongs. The identification server also provides a personal certificate associated with the member to enable the generation of the session-specific certificate.

13 Claims, 3 Drawing Sheets

(58) Field of Classification Search
USPC ........................................................ 713/156
See application file for complete search history.

(56) References Cited

U.S. PATENT DOCUMENTS

| | | | | |
|---|---|---|---|---|
| 2002/0138441 A1* | 9/2002 | Lopatic | ................. | G06F 21/125 |
| | | | | 705/59 |
| 2002/0141491 A1* | 10/2002 | Corts | ................. | G06Q 30/0269 |
| | | | | 375/216 |
| 2003/0105977 A1* | 6/2003 | Brabson | .............. | H04L 63/0823 |
| | | | | 726/13 |
| 2003/0140230 A1* | 7/2003 | de Jong | .............. | H04L 63/0407 |
| | | | | 713/182 |
| 2003/0177351 A1* | 9/2003 | Skingle | ................. | H04L 9/3268 |
| | | | | 713/156 |
| 2005/0015594 A1* | 1/2005 | Ashley | .................... | G06F 21/31 |
| | | | | 713/168 |
| 2005/0108031 A1* | 5/2005 | Grosvenor | ............ | G06Q 30/06 |
| | | | | 705/26.1 |
| 2007/0033400 A1* | 2/2007 | Senez, Jr. | ........... | H04L 63/0428 |
| | | | | 713/168 |
| 2007/0226149 A1* | 9/2007 | McFarlin | ............. | G06Q 20/401 |
| | | | | 705/59 |
| 2008/0091941 A1* | 4/2008 | Yonezawa | ............. | H04L 9/3255 |
| | | | | 713/158 |
| 2008/0184350 A1* | 7/2008 | Chu | ........................ | G06F 21/10 |
| | | | | 726/7 |
| 2009/0133107 A1* | 5/2009 | Thoursie | ............. | H04L 63/0815 |
| | | | | 726/6 |
| 2009/0144814 A1* | 6/2009 | Sacco | ...................... | G06F 21/35 |
| | | | | 726/6 |
| 2009/0169010 A1* | 7/2009 | Dodd | ...................... | H04L 9/083 |
| | | | | 380/277 |
| 2009/0287935 A1* | 11/2009 | Aull | ....................... | H04L 9/3263 |
| | | | | 713/182 |
| 2010/0058058 A1* | 3/2010 | Busari | ................... | G06F 21/445 |
| | | | | 713/169 |
| 2011/0010553 A1 | 1/2011 | Cahn | | |
| 2011/0022479 A1* | 1/2011 | Henley | ................. | G06F 19/328 |
| | | | | 705/14.73 |
| 2014/0223172 A1* | 8/2014 | Meunier | ................. | H04L 9/321 |
| | | | | 713/156 |
| 2015/0038131 A1* | 2/2015 | Wen | .................... | H04L 63/0807 |
| | | | | 455/418 |

OTHER PUBLICATIONS

Preliminary Report on Patentability for PCT/CA2012/000290 dated Mar. 7, 2013.
Office Action dated Mar. 17, 2015 issued in connection with the corresponding Canadian patent application.
Office Action dated Dec. 4, 2015 issued in connection with the corresponding Canadian patent application.
Menezes et al: "Chapter 13: Key Management Techniques", Handbook of Applied Cryptography, CRC press, pp. 543-590; Oct. 1, 1996.
Office Action for Canadian Application No. 2,831,617 dated Dec. 29, 2016, 3 pages.
Office Action dated Apr. 20, 2016 for Canadian Patent Application No. 2,831,617.
Supplementary European Search Report dated Sep. 10, 2014 for European Patent Application No. 12765297.

* cited by examiner

SYSTEM, METHOD, SERVER AND COMPUTER-READABLE MEDIUM FOR REAL-TIME VERIFICATION OF A STATUS OF A MEMBER OF AN ORGANIZATION

CROSS-REFERENCE TO RELATED APPLICATIONS

This is a national stage patent application of PCT/CA2012/000290, filed on Mar. 30, 2012 entitled "SYSTEM, METHOD, SERVER AND COMPUTER-READABLE MEDIUM FOR REAL-TIME VERIFICATION OF A STATUS OF A MEMBER OF AN ORGANIZATION" and claims priority from U.S. Provisional Patent Application No. 61/470,537, filed Apr. 1, 2011, both of which are incorporated by reference in their entirety.

TECHNICAL FIELD

The present technology relates generally to computer systems and information security and, in particular, to computer-implemented cryptographic techniques for authentication and validation of users who are regulated by an authority, regulatory body or other organization.

BACKGROUND

Virtually all professional service industries are today regulated by professional licensing authorities or governing bodies. For example, a lawyer may only practice law in a jurisdiction if the local bar has licensed that lawyer. Similarly, accountants, engineers, medical doctors, dentists, stock brokers, real estate agents, and a plethora of other professionals must remain in good standing with their respective professional organizations in order to be able to engage in the practice of their profession. When a professional is no longer in good standing with his or her professional organization or governing body, there is frequently no easy way for a client or other party relying on the transaction, advice or service provided by the professional to know if the professional in question is no longer licensed. Conventionally, a formal inquiry to the professional's licensing body must be made to ascertain that the professional is in good standing. This takes effort and time and is thus in practice frequently not done. The current state of affairs thus leaves the public exposed to the possibility that the professional is acting without a valid license from the regulatory body. This is particularly important for clients who rely on professionals such as lawyers or accountants who are involved in electronic transactions on behalf of their clients. Current technologies do not enable the status of a member of an organization to be verified in real-time or approximately in real-time to ensure that the professional about to act in the electronic transaction is in fact in good standing and thus has legal capacity to act in the electronic transaction.

A solution to the foregoing technical problem would be highly desirable. Such a solution is disclosed in the present specification and the appended drawings.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

SUMMARY

Figure 1:
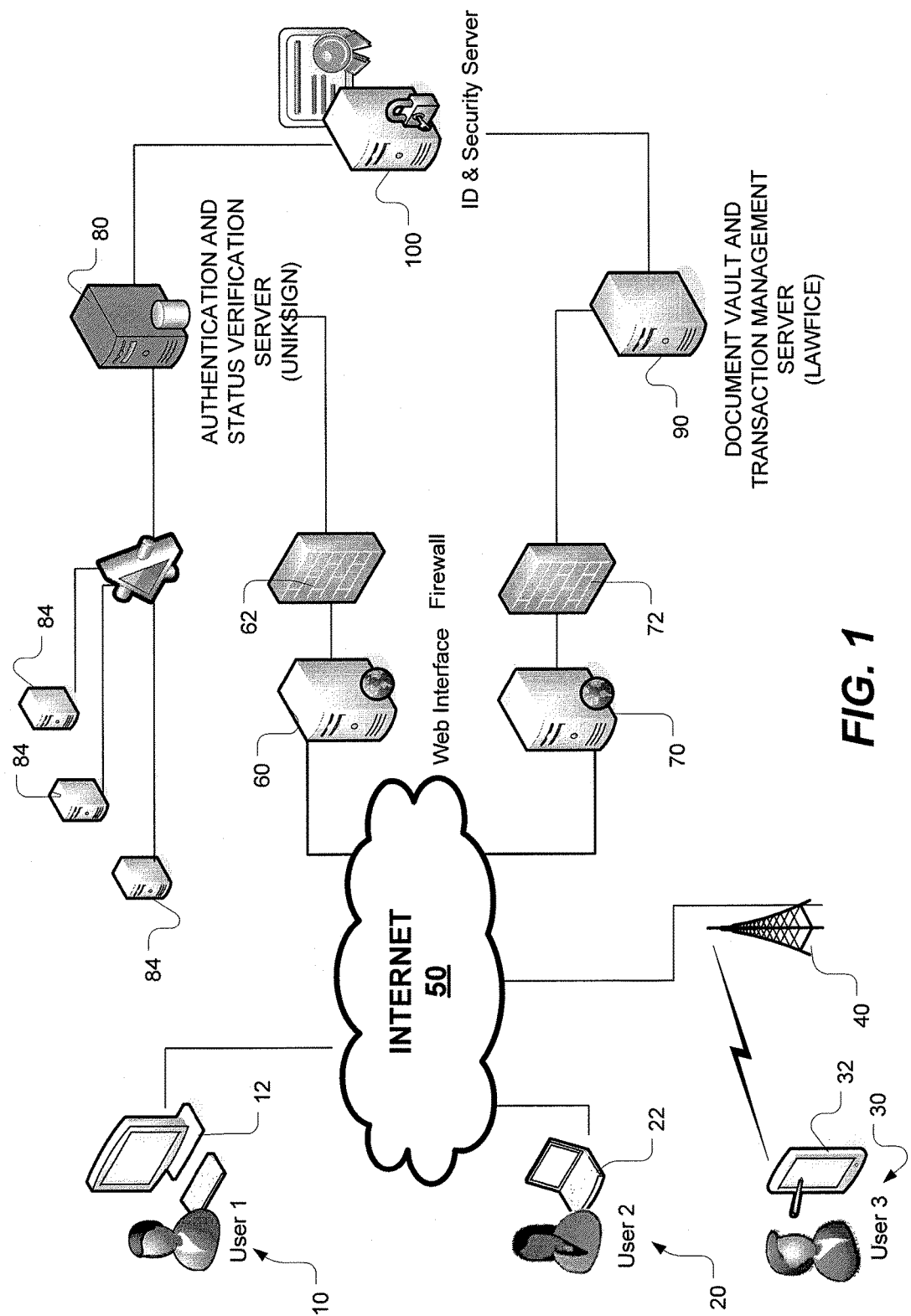
FIG. 1 is a schematic depiction of a computer network in which embodiments of the present invention may be implemented to verify a status of a member of an organization.

The present invention generally provides a novel system, method, and computer-readable medium for automatically verifying a status of a member with a professional organization, governing body or other authority which regulates the practice of the member's profession. In general, and is will be elaborated below in greater detail, the present invention uses a novel authentication and status verification server to send a request to a professional organization's web service to determine the status of the professional member. This request is sent in response to the professional member logging into the authentication and status verification server. Upon receiving affirmation that the professional member is in good standing, i.e. status is OK, the status and verification server then generates a session-specific certificate for use by the professional member in the current session. When the user logs in for another session, another session-specific certificate must be created. The foregoing provides an innovative way for verifying that a professional member is in good standing. This enables professional regulatory bodies, professional licensing authorities and other authority that regulates its membership to control the activities of members that are no longer in good standing, be it because they have retired, failed to pay their membership dues, been suspended for misconduct, etc.

One aspect of the present invention is a method of verifying a status of a member of an organization. The method entails sending a status inquiry request to an organization's web services for a status of a member of the organization, receiving a status reply from the organization's web services, generating a session-specific certificate based on the status reply, and communicating the session-specific certificate to the member.

Another aspect of the present invention is a computer readable medium upon which are stored instructions in code that are configured to perform the steps of the foregoing method when the computer readable medium is loaded into memory and executed on a processor of a computing device.

Another aspect of the present invention is a system for system for verifying a status of a member of an organization. The system includes an authentication and status verification server configured to receive a login request from a computing device associated with the member, an identification server communicatively connected to the authentication and status verification server for receiving login information from the authentication and status verification server and for providing credentials for the member to the authentication and status verification server, and an organization web server for receiving a status inquiry, looking up a status of the member, and for responding with a status report for the member in response to the status inquiry. The identification server is further configured to generate a session-specific certificate and to communicate the session-specific certificate to the authentication and status verification server. The authentication and status verification server is further configured to communicate the session-specific certificate received from the identification server to the computing device associated with the member.

A further aspect of the present invention is a method of issuing a certificate, the method comprising authenticating a member of an organization who logs into a server, verifying a status of the member by communicating a status inquiry from the server to a web server of the organization and by receiving a status reply from the web server of the organization, and generating a certificate based on the status reply.

A further aspect of the present invention is a computer-readable medium comprising programmed instructions in code which, when loaded into a memory and executed by a processor of a server, causes the server to authenticate a member of an organization who logs into a server, verify a status of the member by communicating a status inquiry from the server to a web server of the organization and by receiving a status reply from the web server of the organization, and generate a certificate based on the status reply.

A further aspect of the present invention is an authentication and status verification server comprising a memory operatively coupled to a processor for generating a message comprising a status inquiry request and for causing communication of the message to an organization's web services to obtain a status of a member of the organization. The memory and processor are further configured to receive a status reply from the organization's web services, to generate a session-specific certificate based on the status reply and to communicate the session-specific certificate to the member.

The details and particulars of these aspects of the invention will now be described below, by way of example, with reference to the attached drawings.

DETAILED DESCRIPTION

Embodiments of the present invention, which are described below, enable automated and/or real-time electronic verification of a status of a member of an organization. As will be elaborated below, this technology ensures that members of an organization only engage in electronic transactions when they are in good standing with the organization.

FIG. 1 is a schematic depiction of a computer network in which embodiments of the present invention may be implemented to verify a status of a member of an organization.

As depicted by way of example in FIG. 1, one or more users (who are members of an organization) can be authenticated and their statuses verified when each user logs into the system to perform an electronic transaction. For the sake of illustration, three such users or members are depicted by way of example in FIG. 1. These are User1, designated by reference numeral 10, User2, designated by reference numeral 20, and User3, designated by reference numeral 30. The number of users/members shown in this exemplary embodiment is arbitrary and is solely for the purposes of illustration. Again for the sake of illustration, User1 connects to the system via the Internet 50 using a desktop computer 12, User2 connects to the system via the Internet 50 using a laptop 22 and User3 connects to the system via mobile device 32 communicatively connected to the Internet via a wireless network and gateway. The mobile device 32 may be any wireless communication device, smart phone, cell phone, wireless-enabled PDA, wireless-enabled tablet, or other portable or handheld electronic device that has wireless communication capabilities. The mobile device 32 may connect wirelessly to the system via wireless network (represented schematically by base station tower 40) using any known cellular technologies or communication protocols such as, for example, GSM, EDGE, LTE, CDMA, etc. Other wireless technologies may of course be employed such as, for example, Wi-Fi™, Bluetooth®, satellite link, etc. From the foregoing, it should be apparent that users/members may interact with the system using any computing device with an Internet connection.

As depicted by way of example in FIG. 1, the members (User1, User2 and User3) connect via the Internet using standard communication protocols, such as TCP/IP, to Web interface servers 60, 70 which are respectively connected via firewalls 62, 72 to an authentication and status verification server 80 and to a document vault and transaction management server 90. As depicted in the exemplary architecture shown in FIG. 1, the authentication and status verification server 80 and the document vault and transaction management server 90 are both connected to a common ID and security server 100 (hereafter referred to simply as an "identification server").

Briefly, the document vault and transaction management server 90 (which is not the focus of the present specification) acts as a secure deal room or e-transaction platform where documents can be shared, viewed, created, edited, deleted, etc., or where other acts like reading, reviewing, verifying, approving or voting can be performed, in a secure and controlled environment where those accessing and interacting with the documents or those voting have been granted specific rights and privileges with respect to the documents or the transaction. This server 90 enables electronic transactions to be performed in a cryptographically secure manner where acts taken by members with respect to the documents cannot later be repudiated.

As further depicted by way of example in FIG. 1, the authentication and status verification server 80 is connected to one or more organization web servers 84 such as, for example, web services associated with various professional organizations. Each of these web servers store up-to-date data about the status of each member of the organization, i.e. whether a given member or user is currently in good standing or not.

Figure 2:
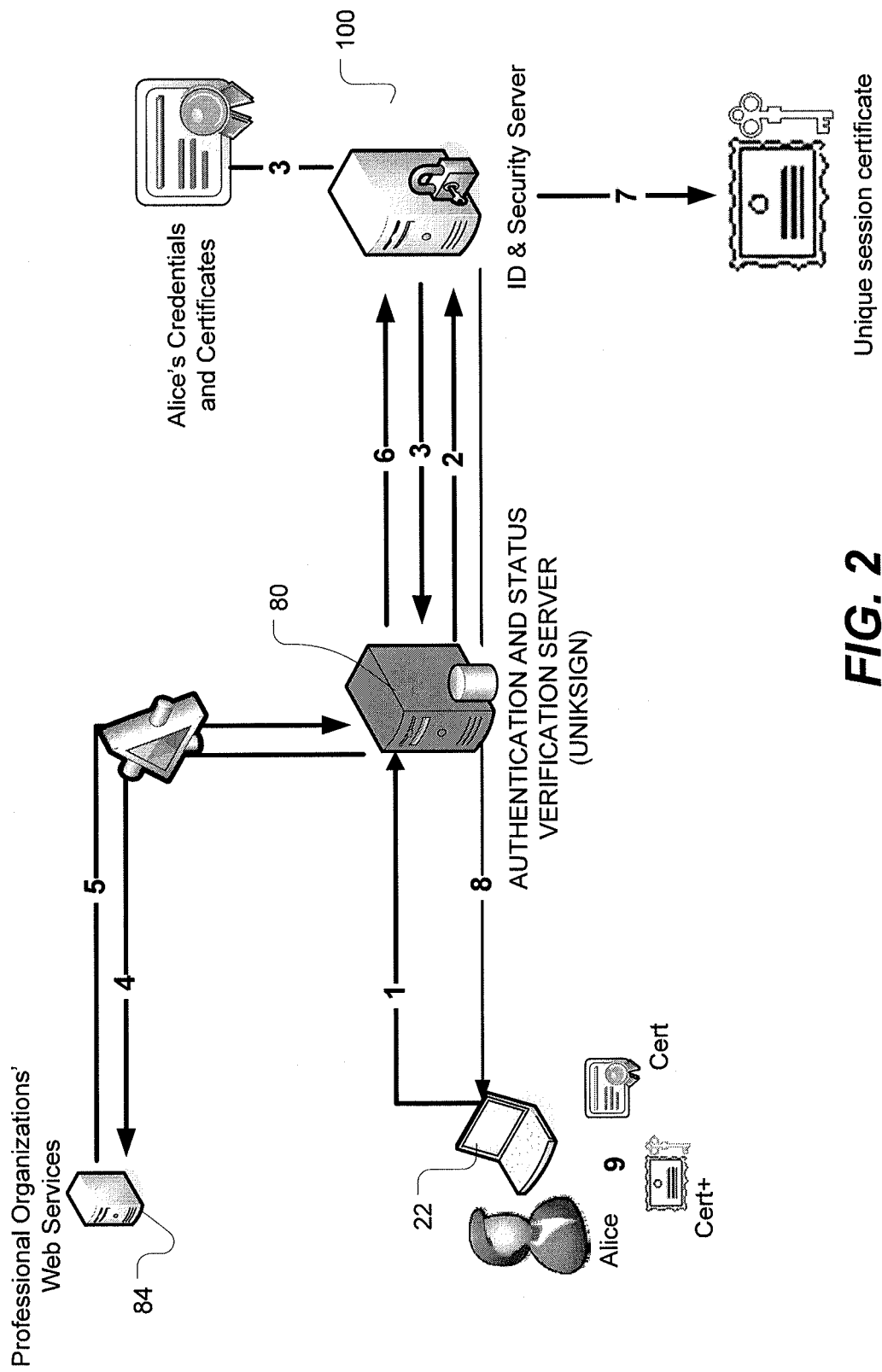
FIG. 2 is a schematic depiction of a system in accordance with one embodiment of the present invention that employs an authentication and verification server and an identification server to verify the status of a member of an organization with the organization's web services.

FIG. 2 is a schematic depiction of a system in accordance with one embodiment of the present invention that employs an authentication and verification server 80 and an identification server 100 to verify the status of a member of an organization with the organization's web services 84. This schematic is presented in conjunction with FIG. 3 which is a message flow outlining the related verification method. The steps numbered 1-9 in FIG. 2 correspond with the message flow steps 1-9 in FIG. 3. These two figures will thus be described together. As shown by way of example in FIG. 2 and FIG. 3, the method commences (at step 1) when a user, named Alice in this example, logs into the system, i.e. logs into the authentication and verification status server 80. At step 2, the authentication and verification status server 80 sends a requests to the identification server 100 to validate Alice's ID. At step 3, the ID server retrieves Alice's credentials and her personal certificate (i.e. a digital certificate or cryptographic certificate associated with the member Alice). Retrieval may be from a memory of the identification server itself or from another secure server or database communicatively connected to the identification server. The credentials and certificate may be stored together or may be stored separately (i.e. on separate servers).

Figure 3:
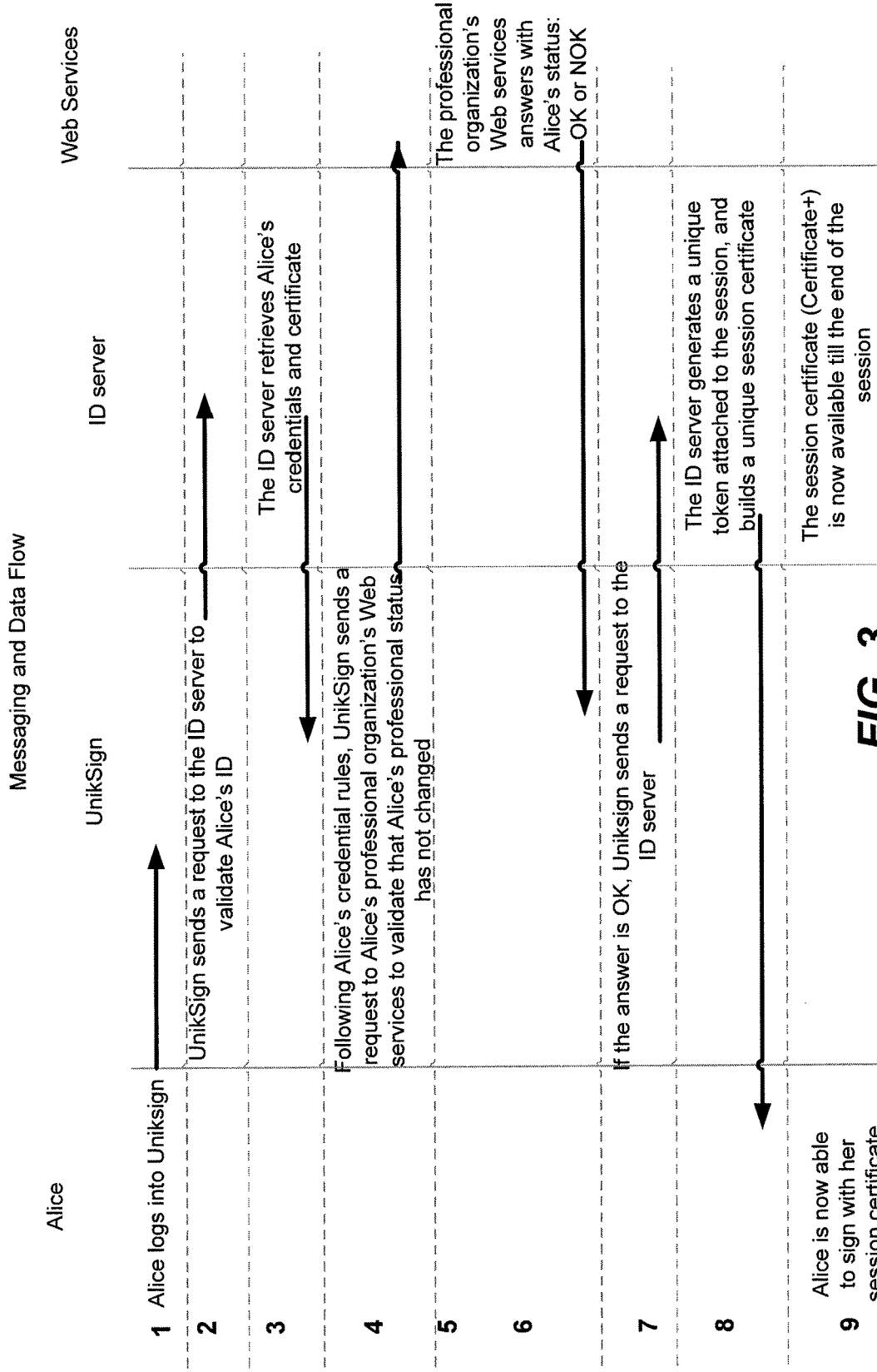
FIG. 3 is a message flow outlining a novel verification method in accordance with an embodiment of the present invention.

Still referring to FIG. 2 and FIG. 3, after obtaining Alice's credentials and determining any rules associated with those credentials, the authentication and verification status server 80 sends a request at step 4 (i.e. transmits a message containing a status inquiry) to Alice's professional organization's Web services to verify Alice's status, i.e. to validate that Alice's professional status is still in good standing. In main implementations, the status inquiry is a message in a prescribed form that the web services can automatically recognize and process to generate an electronic status report or automated reply. In step 5, the web service replies with a status report or status reply. In a simple implementation, the status reply is a binary OK or not OK (NOK). In more nuanced implementations, the status reply may contain limitations on the member's rights or privileges. For example, limitations may prescribe that the member can only practice in certain geographical locations, on transactions that do not exceed a certain monetary value, on certain types of transactions, etc.

Still referring to FIG. 2 and FIG. 3, the authentication and verification status server 80 determines if the status reply is OK or NOK. If the status reply is OK, at step 7, the authentication and verification status server 80 sends a request to the identification server 100. The identification server 100 then generates a unique token (or equivalent) that is attached or otherwise associated with the current session. At step 8, the identification server 100 then builds or generates a unique session-specific certificate (designated herein as cert+). This unique session-specific certificate may be generated by cryptographically augmenting the personal certificate, e.g. by adding other information to the personal certificate. At step 9, the session-specific certificate is communicated to the authentication and verification status. server 80 which then transmits this certificate (cert+) to Alice. Alice can then sign electronically with her session-specific certificate when she performs transactions or acts in the document vault and transaction management server 90. The session-specific certificate remains available to Alice until the end of her session. Upon termination of the session, i.e. when Alice logs out, the session-specific certificate is deleted or retired (and archived). A new certificate must be created for Alice for each subsequent session. The messages sent between the various entities may be encrypted using any number of known encryption techniques, including establishment of a secure tunnel or virtual private network (VPN).

The technology disclosed above is thus able to electronically verify in real-time that the member of the organization is in fact in good standing with the organization as a precondition to allowing the member to engage in an electronic transaction or to electronically perform an act. Transactions or acts (such as those performed in the document vault and transaction management server 90) can only be performed by the member once electronic approval has been received from the organization web server in the form of a status reply to a status inquiry. All acts or transactions are signed by the member's session-specific certificate, which is created uniquely for the session. Because the session-specific certificate is created in response to both authentication of the member and a separate status verification with the member's organization, a digital signature of the member using this session-specific certificate cannot be repudiated.

The personal certificate and the session-specific certificate thus provide first and second digital identities to the member. The first digital identity is a personal digital identity that uniquely identifies the member. The second digital identity further identifies the member as being a member of the organization. For example, in the specific context of a professional who is a member of a professional organization, the second digital identity establishes not only who the professional is but that the professional is in good standing with the professional organization. This second digital identity that can be used to perform professionally related digital tasks such as engaging in transactions in the document vault and transaction management server 90.

Once the member in good standing has been verified with his or her organization, this member may then verify the identity of a third party. This verification may, for example, involve the member examining identity papers, personal identification documents, biometric data output from a biometric system, etc. Once the member is satisfied to a sufficient degree that the third party is in fact the person that the third party purports to be, the following novel method may be performed that involves the member, using his or her professional digital identity (e.g. his or her augmented certificate CERT+), electronically vouching for the identity of the third party. The method may be performed, for example, by creating a digital signature using the member's session-specific certificate (the professional digital identity) in connection with the verification of the third party. In other words, the member digitally signs to signify that the member vouches for an identity of a third party. In response to the digital signature by the member, a new digital certificate is created for the third party. As such, the new digital certificate created for the third party is predicated or otherwise linked to the certificate used by the member who has verified the identity of the third party.

A more detailed implementation of this method is now described. In a first step, a member of the organization logs into the server 80 and is authenticated. The login may involve, for example, a username, password, biometrics, etc. The objective of the member, at this point, is to validate the identity of a third party (i.e. an individual or person) who wishes to obtain his or her own personal certificate. Before the third party can be granted a certificate, the member's status must first be verified. This may be done, as disclosed above, by a web service between the server 80 and the organization's web server(s). As already described above, a status reply is returned in response to a status inquiry sent to the organization's web server. This status reply confirms whether the member is in good standing with the organization. This confirmation may optionally also include more detailed information about the member's status, role, title or capacity within the organization. If the status reply confirms that the member is in good standing, a session-specific certificate is generated. This session-specific certificate is required for the subsequent process of validating the identity of the third party. In other words, the validation of the identity of the third party is linked to the status verification of the member validating the identity of the third party. Only if the member is successfully authenticated and only if the member's status is successfully verified can a session-specific certificate be created, which is a precondition for the successful validation of the third party's identity. As such, the generation of the session-specific certificate for the member is a precondition for the generation of a digital certificate (personal certificate) for the third party. Accordingly, the generation and/or use of a digital certificate is dependent on the issuance of a session-specific certificate that is only itself generated upon completion of a process whereby the member is authenticated and whereby the status of the member is verified with the web service of an organization to which the member belongs.

The foregoing can also be understood as a novel method of issuing a certificate (i.e. a digital certificate or cryptographic certificate) that requires the server issuing the certificate to engage in a verification dialogue or message exchange with a web server of an organization to first ascertain that a member requesting authentication is in good standing with the organization prior to generating a certificate for that member. In other words, upon receipt of a login request or other authentication request from a member of an organization, the server automatically triggers a status verification process with an external web server controlled by the organization. Upon receipt of a confirmation of the member's status, a certificate is generated for the member. This method may be implemented by a certificate-issuing server or by any other computing device which reads the code from a computer-readable medium.

Each of the servers described above may be a single server machine or a server cluster. The foregoing technology may also be implemented on a cloud. Each server disclosed in the figures may include one or more processors (or microprocessors), memory, one or more communications ports and input/output devices. It should be understood that the system depicted in the figures is exemplary. Functions that are shown as being performed by separate and distinct servers may, in other implementations, be performed by a single server.

Any of the methods disclosed herein may be implemented in hardware, software, firmware or any combination thereof. Where implemented as software, the method steps, acts or operations may be programmed or coded as computer-readable instructions and recorded electronically, magnetically or optically on a non-transitory computer-readable medium, computer-readable memory, machine-readable memory or computer program product. In other words, the computer-readable memory or computer-readable medium comprises instructions in code which when loaded into a memory and executed on a processor of a computing device cause the computing device to perform one or more of the foregoing method(s).

A computer-readable medium can be any means that contain, store, communicate, propagate or transport the program for use by or in connection with the instruction execution system, apparatus or device. The computer-readable medium may be electronic, magnetic, optical, electro-magnetic, infrared or any semiconductor system or device. For example, computer executable code to perform the methods disclosed herein may be tangibly recorded on a computer-readable medium including, but not limited to, a floppy-disk, a CD-ROM, a DVD, RAM, ROM, EPROM, Flash Memory or any suitable memory card, etc. The method may also be implemented in hardware. A hardware implementation might employ discrete logic circuits having logic gates for implementing logic functions on data signals, an application-specific integrated circuit (ASIC) having appropriate combinational logic gates, a programmable gate array (PGA), a field programmable gate array (FPGA), etc.

The foregoing example refers to professional organizations such a professional licensing bodies or other such authorities. However, this technology can be applied to any organization that has maintains a web registry of its members that can be consulted to determine the status of a given member.

This invention has been described in terms of specific embodiments, implementations and configurations which are intended to be exemplary only. Persons of ordinary skill in the art will appreciate, having read this disclosure, that many obvious variations, modifications and refinements may be made without departing from the inventive concept(s) presented herein. The scope of the exclusive right sought by the Applicant(s) is therefore intended to be limited solely by the appended claims.

The invention claimed is:

1. A method of verifying a status of a professional member of a professional organization who is to subsequently vouch for an identity of a third party, the method comprising:
    sending a status inquiry request to a web service of a regulatory authority of the professional organization for the status of the professional member of the organization to determine whether the professional member is in good standing and empowered to verify the identity of the third party;
    receiving a status reply from the web service of the organization indicating whether the professional member is in good standing;
    generating a session-specific certificate based on the status reply provided that the professional member is in good standing;
    communicating the session-specific certificate to the professional member;
    generating a digital certificate for the third party using the session-specific certificate as a precondition for generating the digital certificate for the third party, wherein the digital certificate of the third party is linked to the session-specific certificate of the professional member to prove that the digital certificate for the third party was generated when the professional member was in good standing with the organization;
    retiring and archiving the session-specific certificate at an end of a session after the professional member logs out;
    wherein the digital certificate is used to authenticate the third party and the session-specific certificate is used to verify the status of the professional member of the professional organization; and,
    wherein being in good standing comprises having fulfilled the necessary current requirements in order to be able to engage in the practice of the professional member's profession.

2. The method as claimed in claim 1 wherein the sending of the status inquiry request is triggered by the professional member logging into an authentication and status verification server.

3. The method as claimed in claim 2 further comprising:
    receiving ID information from the professional member when the professional member logs into the authentication and status verification server; and
    communicating the ID information to an identification server to validate the ID information.

4. The method as claimed in claim 3 wherein sending the status inquiry request comprises:
    obtaining credentials and a personal certificate from the identification server for the professional member; and
    identifying the web service for the professional organization associated with the professional member based on the credentials; and
    generating a message comprising the status inquiry request.

5. The method as claimed in claim 1 wherein generating the session-specific certificate comprises:
    obtaining a personal certificate associated with the professional member; and
    cryptographically augmenting the personal certificate to generate the session-specific certificate.

6. The method as claimed in claim 1 further comprising:
receiving a digital signature created by the professional member using the session-specific certificate belonging to the professional member to signify that the professional member vouches for the identity of the third party; and
generating a new digital certificate for the third party in response to the digital signature to signify that the professional member has verified the identity of the third party; and wherein generating the digital certificate for the third party is in response to receiving the digital signature of the professional member.

7. A system for verifying a status of a professional member of a professional organization who is to subsequently vouch for an identity of a third party, the system comprising:
an authentication and status verification hardware server configured to receive a login request from a computing device associated with the professional member;
an identification hardware server communicatively connected to the authentication and status verification server for receiving login information from the authentication and status verification server and for providing credentials for the professional member to the authentication and status verification server;
an organization hardware web server for receiving a status inquiry request, looking up the status of the professional member, and for responding with a status report for the professional member in response to the status inquiry request indicating whether the professional member is in good standing and empowered to verify the identity of the third party;
wherein the identification server is further configured to generate a session-specific certificate and to communicate the session-specific certificate to the authentication and status verification server;
wherein the authentication and status verification server is further configured to communicate the session-specific certificate received from the identification server to the computing device associated with the professional member; and
wherein the identification server generates a digital certificate for the third party using the session-specific certificate as a precondition for generating the digital certificate for the third party, wherein the digital certificate of the third party is linked to the session-specific certificate of the professional member to prove that the digital certificate for the third party was generated when the professional member was in good standing with the organization;
wherein the authentication and status verification server is further configured to retire and archive the session-specific certificate at an end of a session after the professional member logs out;
wherein the digital certificate is used to authenticate the third party and the session-specific certificate is used to verify the status of the professional member of the professional organization; and,
wherein being in good standing comprises having fulfilled the necessary current requirements in order to be able to engage in the practice of the professional member's profession.

8. The system as claimed in claim 7 wherein the identification server generates the session-specific certificate by cryptographically augmenting a personal certificate associated with the professional member.

9. The system as claimed in claim 8 wherein the identification server generates a unique token associated with the session.

10. The system as claimed in claim 7 wherein the authentication and verification server obtains a time-stamped confirmation from the organization web server and stores the confirmation.

11. A non-transitory computer-readable medium comprising programmed instructions in code for verifying a status of a professional member of a professional organization who is to subsequently vouch for an identity of a third party, which, when loaded into a memory and executed by a processor of an authentication and status verification hardware server, cause the server to:
sending a status inquiry request to a web service of a regulatory authority of the professional organization for the status of the professional member of the organization to determine whether the professional member is in good standing and empowered to verify the identity of the third party;
receiving a status reply from the web service of the organization indicating whether the professional member is in good standing;
generating a session-specific certificate based on the status reply provided that the professional member is in good standing;
communicating the session-specific certificate to the professional member;
generating a digital certificate for the third party using the session-specific certificate as a precondition for generating the digital certificate for the third party, wherein the digital certificate of the third party is linked to the session-specific certificate of the professional member to prove that the digital certificate for the third party was generated when the professional member was in good standing with the organization;
retiring and archiving the session-specific certificate at an end of a session after the professional member logs out;
wherein the digital certificate is used to authenticate the third party and the session-specific certificate is used to verify the status of the professional member of the professional organization; and,
wherein being in good standing comprises having fulfilled the necessary current requirements in order to be able to engage in the practice of the professional member's profession.

12. The computer-readable medium as claimed in claim 11 wherein the code is further configured to cause the authentication and status verification server to obtain a personal certificate associated with the professional member from an identification server, and wherein the session-specific certificate is generated based on the personal certificate.

13. The computer-readable medium as claimed in claim 11 wherein the code is configured to cause the authentication and status verification server to retrieve credentials from an identification server and to identify based on the credentials the web service of the professional organization to which the professional member belongs.

* * * * *